United States Patent [19]
Zuech

[11] 3,865,892
[45] Feb. 11, 1975

[54] HOMOGENEOUS DISPROPORTIONATION-DIMERIZATION OF OLEFINS

[75] Inventor: Ernest A. Zuech, Bartlesville, Okla.

[73] Assignee: Phillips Petroleum Company, Bartlesville, Okla.

[22] Filed: Apr. 17, 1972

[21] Appl. No.: 244,855

Related U.S. Application Data

[63] Continuation of Ser. No. 849,181, Aug. 11, 1969, abandoned.

[52] U.S. Cl....... 260/683 D, 252/429 C, 252/431 P, 260/683.15 D
[51] Int. Cl............................. C07c 3/10, C07c 3/62
[58] Field of Search................ 260/683 D, 683.15 D

[56] References Cited
UNITED STATES PATENTS

| | | | |
|---|---|---|---|
| 3,330,882 | 7/1967 | Albright | 260/683.15 |
| 3,390,201 | 6/1968 | Drew | 260/683.15 D |
| 3,485,881 | 12/1969 | Zuech | 260/666 |
| 3,513,218 | 5/1970 | Faltings et al. | 260/683.15 D |
| 3,535,401 | 10/1970 | Calderon et al. | 260/683 D |
| 3,558,515 | 1/1971 | Kittleman et al. | 260/683 D |
| 3,558,518 | 1/1971 | Zuech | 252/429 |
| 3,592,869 | 7/1971 | Cannell | 260/683.15 D |
| 3,627,700 | 12/1971 | Zuech | 260/683.15 D |
| 3,709,953 | 1/1973 | Bergem et al. | 260/683.15 D |
| 3,721,718 | 3/1973 | Hughes et al. | 260/683 D |

*Primary Examiner*—Paul M. Coughlan, Jr.

[57] ABSTRACT

Olefins are converted by contact with a catalyst system made from a homogeneous olefin dimerization component, a homogeneous olefin disproportionation component, and a selected organoaluminum halide adjuvant to provide higher molecular weight olefins.

10 Claims, No Drawings

HOMOGENEOUS DISPROPORTIONATION-DIMERIZATION OF OLEFINS

This application is a continuation of application Ser. No. 849,181, filed Aug. 11, 1969, now abandoned.

FIELD OF THE INVENTION

This invention relates to the conversion of olefins to higher molecular weight olefins. In another aspect, this invention relates to homogeneous catalyst systems.

DESCRIPTION OF THE PRIOR ART

It has recently been found that homogeneous catalysts are active for the disproportionation of olefins to other olefins of both higher and lower molecular weight. For example, a complex such as (triphenylphosphine)$_2$Mo(NO)$_2$Cl$_2$, when admixed with methylaluminum sesquichloride, disproportionates propylene to substantial quantities of both ethylene and butenes. Additionally, it has recently been discovered that certain homogeneous catalysts are capable of effective dimerization of olefins. By dimerization, it is meant the reaction of an olefin to produce a dimer thereof, or an oligomer, having a carbon atom number which is a multiple of the starting material. For example, a complex such as (triphenylphosphine)$_2$NiCl$_2$, when admixed with ethylaluminum dichloride, converts ethylene to butenes in high yields together with small amounts of hexenes and octenes.

However, it is well known in the art that it is oftentimes very difficult to simultaneously carry out two catalytic conversions in the same reaction zone. It cannot be predicted that a combination of catalysts, particularly homogeneous catalysts, will be a compatible one; moreover, it cannot be predicted what products will be obtained when two homogeneous catalysts are combined.

SUMMARY OF THE INVENTION

Quite unexpectedly, it has been found that a homogeneous olefin dimerization catalyst component and a homogeneous olefin disproportionation catalyst component can be combined in the presence of an organoaluminum halide to provide a catalyst system which results in the disproportionation of olefins and the dimerization of olefins in the same reaction zone. Thus, the catalyst of the invention can be used to convert olefins to other higher olefins which are not necessarily limited to multiples of the molecular weight of the original feed olefin.

Further in accordance with the invention, it has been found that, by varying the type and proportions of the dimerization and disproportionation components, olefin products can be obtained which are either of a narrow or broad molecular weight distribution.

Further in accordance with the invention, the products of the process of the invention comprise olefins having a molecular weight which is greater than the original feed olefin but is not necessarily limited to multiples of the molecular weight of the original feed olefin. Varying amounts of ethylene can sometimes also be present in the product.

DESCRIPTION OF THE PREFERRED EMBODIMENTS

The olefins which are applicable for conversion in the process of the present invention are acyclic nontertiary monoolefins having from 3 to about 12 carbon atoms per molecule and mixtures thereof. The olefins can be internal or terminal. By nontertiary olefins it is meant those olefins wherein each carbon atom, which is attached to another carbon atom by means of a double bond, is also attached to at least one hydrogen atom. Some examples of these are propylene, butene-1, butene-2, pentene-1, pentene-2, 3-methylpentene-1, hexene-1, hexene-3, 4-methylhexene-1, octene-2, decene-1, dodecene-1, and the like.

As mentioned above in the summary of the invention, the catalyst system of the present invention is made from (1) a homogeneous olefin disproportionation component, (2) a homogeneous olefin dimerization component, and (3) a selected organoaluminum halide adjuvant.

The olefin disproportionation components which can be used in the catalyst system of the present invention are those transition metal complexes, which when admixed with a suitable organoaluminum halide adjuvants, show activity for the disproportionation of olefins. A large number of such catalysts have recently been found and these include complexes of transition metals such as molybdenum, tungsten, rhenium, iron, ruthenium, osmium, rhodium, iridium, copper, gold, and others.

Suitable homogeneous olefin disproportionation components of the catalyst system which are utilized in the invention are complexes which can be represented by the formula $[(L)_a M_c Z_d]_x$ wherein each (L) is an organic or inorganic ligand; M is a transition metal of Group IB, IIIB, IVB, VB, VIIB, molybdenum or tungsten, or the iron and cobalt subgroups of Group VIII; Z is halide or a radical such as CN, SCN, OCN, and SnCl$_3$; $a$ and $d$ are numbers 0–6, $c$ is 1–4; $x$ is a number indicative of the polymeric state of the compound; at least one of (L) or Z is present; and wherein the number of (L) and Z groups present in the component (a) compound shall not be greater than the number required for the metal to achieve the closed shell electronic configuration of the next higher atomic number inert gas; preferred (L) groups are R$_3$Q, R$_3$QO, R$_2$Q—QR$_2$, R$_2$NR$^1$, O, S, CO, NO, R$_2$N—R$^2$—NR$_2$, R—S—R,

,

[π—(CHR$^4$—CR$^4$—CH$_2$)], R$^5$(CH)$_k$, R$^5$(COO—)$_k$, RCOR$^6$(COO—)$_k$, [(RCO)$_2$CH—], (R$_2$NCSS—), unsubstituted and R$^5$ group-substituted pyridine, unsubstituted and R$^5$ group-substituted bipyridine, or unsubstituted and R group-substituted cyclopentadienyl radicals; wherein R is an aromatic or saturated aliphatic radical, including radicals substituted with groups such as halo groups or alkoxy groups and the like, having up to 20 carbon atoms; R$^1$ is hydrogen or an R radical; R$^2$ is a divalent R radical; R$^3$ is a divalent saturated aliphatic or ethylenically unsaturated aliphatic radical having from 4 to 10 carbon atoms; R$^4$ is hydrogen or methyl radical; R$^5$ is an aromatic, saturated aliphatic, or ethylenically unsaturated aliphatic radical having up to 30 carbon atoms; R$^6$ is a divalent saturated aliphatic radical having from 1 to 10 carbon atoms; Q is phosphorus, arsenic, or antimony; and $k$ is 1–2.

The preferred disproportionation component compounds of the catalyst system are complex compounds of the metals of Group VIIB, the iron and cobalt subgroups of Group VIII, and molybdenum or tungsten. The more preferred metals of these are molybdenum, tungsten, rhenium, ruthenium, or rhodium with the most preferred being a metal complex of molybdenum, such as $Mo(stearate)_2(NO)_2Cl_2$.

It is generally desired to prepare and utilize the disproportionation complex in the catalyst system of the invention in the form of nonisolated admixtures of its components. A transition metal compound and one or more complexing agents are merely combined in proportions and under conditions of temperature and time which permit the active transition metal complex to be formed, generally in a diluent in which the components are at least partly soluble. Suitable transition metal starting compounds, for example, are halides, oxyhalides, carbonyls, carbonyl halides, or salts of inorganic or organic acids, preferably halides.

When the homogeneous disproportionation component of the catalyst system is the product obtained by combining a compound of a transition metal, as hereinbefore discussed, with one or more suitable complexing agents, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal compound to the selected complexing agent can be in the range of from about 0.1:1 to about 10:1, preferably from about 0.2:1 to about 2:1. However, still higher proportions of complexing agents can be used if desired. For example, the gaseous NO or nitrosyl halides can be used in large excess to promote rapid complex formation. The complexes are obtained by combining these ingredients at a temperature preferably in the range of from about −25° to about 130°C., more preferably 0° to about 60°C., for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system. It is sometimes desirable to remove excess gaseous complexing agents, such as NO, by simple evaporation or stripping before contact with the organoaluminium halide component of the catalyst system.

Some specific examples of complexes which can be employed as the disproportionation component of the catalyst system of the invention are $(triphenylphosphine)_2(NO)_2MoCl_2$, $(NO)_2MoCl_2$, $(pyridine)_2(NO)_2MoCl_2$, NO-treated $(triphenylphosphine)_2MoCl_4$, NO-treated $(pyridine)_2MoCl_4$, NO-treated $(butyronitrile)_2MoCl_4$, $Mo(stearate)_2(NO)_2Cl_2$, NO-treated pyridine-treated $MoCl_5$, $Mo(benzoate)_2(NO)_2Cl_2$, NO-treated $(acetylacetonate)_2MoO_2$, NO-treated $(butyronitrile)_2MoCl_4$, NO-treated $MoCl_3$, NO-treated tetrallyltin-treated $MoCl_5$, NOCl-treated $MoO_2$, NO-treated $MoCl_5$, NO-treated $(cyclopentadienyl)Mo(CO)_3I$, NOCl-treated pyridine-treated $MoO_2$, NO-treated $(stearate)_2MoCl_3$, NO-treated tributylphosphine-treated $MoCl_5$, NO-treated $MoCl_2$, NO-treated thiophene-treated $MoCl_5$, NO-treated $WCl_6$, NO-treated pyridine-treated $WCl_6$, NO-treated $MoO_2$, NO-treated benzoic acid-treated $WCl_6$, NOCl-treated $(triphenylphosphine)_2W(CO)_4$, $(triphenylphosphine)_2(NO)_2WCl_2$, NO-treated $Mo(acetate)_2$, $(triphenylphosphine)_2ReOCl_3$, $(triphenylphosphine)_2ReCl_4$, $(triphenylphosphine)_2ReOBr_3$, $(acetylacetonate)_4Re_2Cl_4$, $(triphenylphosphine)ReOBr_3$, CO-treated triphenylphosphine-treated $RuCl_3$, NO-treated $RuCl_3$, $(triphenylphosphine)_4(CO)_2Ru_2(SnCl_3)Cl_3$, NO-treated triphenylphosphine-treated $RuCl_3$, NOCl-treated $(triphenylphosphine)_3RhCl$, NO-treated $(triphenylphosphine)_3RhCl$, $(\pi-allyl)_2RhCl$, NO-treated triphenylphosphine-treated $RhCl_3$, $(triphenylphosphine)_3Cu_2Cl_2$, $(triphenylphosphine)AuCl$, $[(triphenylphosphine)-AgBr]_x$, $(triphenylphosphine)_2Cr(CO)_4$, $(triphenylphosphine)_2MoCl_4$, $SmCl_3$, $ThCl_4$, $UCl_3$, $UCl_4$, $(cyclopentadienyl)TiCl_3$, pyridine-treated $TiCl_4$, $(acetylacetonate)_4$-Zr, NO-treated benzoic acid-treated $NbCl_5$, NO-treated $(triphenylphosphine)_2CoCl_2$, NO-treated triphenylphosphine-treated $IrCl_3$, NO-treated CO-treated triphenylphosphine-treated $IrCl_3$, and the like, and mixtures thereof.

The olefin dimerization component of the catalyst system of the present invention can be any transition metal salt or complex which is at least partly soluble in hydrocarbons and, when admixed with a suitable organoaluminum halide, shows activity for the dimerization of olefins. For example, U.S. Pat. No. 3,379,706, issued Apr. 23, 1968, discloses $\pi$-allyl complexes of palladium, nickel, platinum, cobalt, iron, tungsten, molybdenum, chromium, vanadium, zirconium, and titanium which when admixed with suitable organoaluminum compounds are capable of dimerizing olefins.

The presently preferred olefin dimerization components are hydrocarbon-soluble complexes of nickel or chromium. The chromium complexes which are preferred for use in the present invention are those which have the formula $(L_1)_2(NO)_2CrX_2$, $(L_1)_2CrX_2$, $(L_2)_3CrX_3$, or $[(L_3)_2CrX_3]_2$ wherein X is chlorine, bromine or iodine. The $(L_1)$ ligands which can be employed in the chromium halide complexes are selected from: $R_3{}^7P$, $R_3PO$, unsubstituted or R-substituted pyridine, or unsubstituted or R-substituted pyridine oxide; the $(L_2)$ ligands which are applicable are unsubstituted or R-substituted pyridines; the $(L_3)$ ligands which are applicable are $R_3{}^7P$; wherein each R is as defined previously, each $R^7$ is a saturated aliphatic hydrocarbon radical having up to 20 carbon atoms, and wherein the total number of carbon atoms in the chromium complex does not exceed about 60.

Examples of chromium complexes of the type $(L_1)_2(NO)_2CrX_2$ are
bis(tributylphosphine)dinitrosyldichlorochromium
bis(tricyclopentylphosphine)dinitrosyldiiodochromium
bis(triphenylphosphine oxide)dinitrosyldichlorochromium
bis(tributylphosphine oxide)dinitrosyldichlorochromium
bis(tricyclopentylphosphine oxide)dinitrosyldibromochromium
bis(tribenzylphosphine oxide)dinitrosyldiiodochromium bis(tri-o-tolylphosphine oxide)dinitrosyldichlorochromium
bis(pyridine)dinitrosyldichlorochromium
bis(4-methylpyridine)dinitrosyldibromochromium
bis(2-methyl-4-isobutylpyridine)dinitrosyldiiodochromium
bis(4-phenylpyridine)dinitrosyldichlorochromium
bis(4-eicosylpyridine)dinitrosyldichlorochromium
bis(pyridine oxide)dinitrosyldichlorochromium
bis (4-cyclohexylpyridine oxide)dinitrosyldibromochromium
bis(2,3-dimethyl-4,5-diethylpyridine oxide)dinitrosyldiiodochromium and the like and mixtures thereof.

Examples of chromium complexes of the type $(L_1)_2CrX_2$ are
bis(tributylphosphine)dichlorochromium
bis(tridecylphosphine)dibromochromium
bis(triphenylphosphine oxide)dichlorochromium
bis(4-ethylpyridine)dichlorochromium
bis(tridecylphosphine oxide)dibromochromium
bis(triethylphosphine oxide)diiodochromium
bis(tribenzylphosphine oxide)dichlorochromium
bis(pyridine)dichlorochromium
bis(3,5-dimethylpyridine)dichlorochromium
bis(4-phenylpyridine)dibromochromium
bis(4-dodecylpyridine oxide)dibromochromium
bis(3-methyl-4-cyclohexylpyridine oxide)dichlorochromium and the like and mixtures thereof.

Examples of $(L_2)_3CrX_3$ chromium complexes are:
tris(pyridine)trichlorochromium
tris(4-ethylpyridine)trichlorochromium
tris(pyridine)tribromochromium
tris(2,3,4-trimethylpyridine)triiodochromium
tris(4-eicosylpyridine)trichlorochromium
tris(4-benzyl-5-methylpyridine)trichlorochromium
tris(3-cycloheptylpyridine)trichlorochromium
tris(4-o-tolylpyridine)tribromochromium
tris(3-isobutylpyridine)trichlorochromium and the like and mixtures thereof Examples of $[(L_3)_2CrX_3]_2$ chromium complexes are:
[bis(tributylphosphine)trichlorochromium]$_2$
[bis(trimethylphosphine)triiodochromium]$_2$
[bis(tricyclohexylphosphine)tribromochromium]$_2$
[bis(trioctylphosphine)trichlorochromium]$_2$
[bis(tridecylphosphine)trichlorochromium]$_2$
[bis(tricyclobutylphosphine)trichlorochromium]$_2$
[bis(tri-sec-butylphosphine)trichlorochromium]$_2$
and the like and mixtures thereof.

The chromium halide complexes described above can be prepared by any suitable method. For example, the chromium halide complex is formed by contacting a chromium halide, such as $CrCl_3$, with an applicable phosphine, phosphine oxide, pyridine, pyridine oxide, nitric oxide, or a nitrosyl halide corresponding to the ligands described above under conditions of time and temperature which are sufficient to permit the complex to be formed. In such a preparation, the molar proportion of the chromium halide salt to the coordinating compounds will correspond, approximately, to the stoichiometry indicated in the formulas of the chromium complexes listed above. Nitric oxide or nitrosyl halide, however, can be, and generally is, present in substantial excess. These ingredients are generally mixed at a temperature in the range of from about 0° to about 130°C., preferably 20° to about 60°C., for a time in the range of from a few seconds up to about 24 hours, preferably in the presence of a diluent in which the components of the reaction are at least partially soluble. Any convenient diluent such as methylene chloride, benzene, chlorobenzene, and the like, can be used for this purpose.

The chromium halide complexes of the catalyst system are prepared before contact is made with the homogeneous disproportionation component. It is sometimes desirable to remove excess or unreacted NO or nitrosyl halides from the chromium halide complex, if they are present, before contact is made with the homogeneous disproportionation component. Such removal can be conveniently carried out by warming the complex under reduced pressure to evaporate the NO or nitrosyl halide. Such removal of this excess reagent is not a necessity but is frequently desirable, because the excess reagent appears to consume some of the aluminum component which is added later. For this same reason, grossly excessive amounts of any of the complexing agents should be avoided.

The most preferred nickel complexes which are utilized in the catalyst system of the present invention include a complex represented by $(R_3P)_2NiX_2$, $(L_1)_2NiX_2$, $(L_4)NiX_2$, and $(L_5)_2Ni$ wherein R, $(L_1)$, and X are as previously defined, $(L_4)$ is unsubstituted or R-substituted 2,2'-bipyridines, $(L_5)$ is unsubstituted or R-substituted picolinate radicals, and wherein the total number of carbon atoms in the complex does not exceed about 60.

Some examples of suitable nickel halide complexes which can be used as the dimerization component of the catalyst system are
bis(triphenylphosphine)dichloronickel
bis(tributylphosphine)dibromonickel
bis(tricyclopentylphosphine)diiodonickel
bis(tribenzylphosphine)dichloronickel
bis[tri(4-tolyl)phosphine]dibromonickel
bis(triisobutylphosphine)dichloronickel
bis(trimethylphosphine)dibromonickel
bis[tri(2-naphthyl)phosphine]diiodonickel
bis[tri(2-ethylhexyl)phosphine]dichloronickel
bis(tricyclohexylphosphine)dibromonickel
bis(eicosyldimethylphosphine)dichloronickel
(2,2'-bipyridine)dichloronickel
(4,4'-diisobutyl-2,2'-bipyridine)dibromonickel
bis(triphenylphosphine oxide)diiodonickel
bis(trihexylphosphine oxide)dichloronickel
bis(methyldiphenylphosphine oxide)dichloronickel
bis(pyridine)dichloronickel
bis(4-dodecylpyridine)dibromonickel
bis(2,3,4,5-tetramethylpyridine)diiodonickel
bis(pyridine-N-oxide)dichloronickel
bis(2-picoline-N-oxide)dichloronickel
bis(3,4-diethylpyridine-N-oxide)dibromonickel
bis(picolinato)nickel
bis(4-methylpicolinato)nickel
bis(3,5-dimethyl-4-dodecylpicolinato)nickel
bis(4-cyclohexylpicolinato)nickel and the like and mixtures thereof.

The complex nickel compounds are known in the art and can be prepared by any suitable technique. For example, a bis(trihydrocarbylphosphine)dihalonickel complex is prepared by combining a nickel dihalide with a trihydrocarbyl phosphine in a suitable solvent. Other complexes are prepared analogously.

The organoaluminum halide adjuvant of the catalyst system of the invention can be represented by the formula $R_xAlX_y$ where $x$ and $y$ are integers of at least 1 whose total is 3. R is as defined above and is preferably an alkyl radical containing 1 to 5 carbon atoms per radical. X is a halogen such as chlorine, bromine, and iodine.

Some examples of the aluminum-containing compound, are: methylaluminum dichloride, dimethylaluminum chloride, diethylaluminum bromide, ethylaluminum dichloride, ethylaluminum dibromide, propylaluminum diiodide, dibutylaluminum chloride, phenylaluminum dibromide, dibenzylaluminum chloride, 4-tolylaluminum dichloride, dodecylaluminum dibromide, eicosylaluminum dichloride, butylaluminum dichloride, and mixtures thereof including methylaluminum sesquichloride, ethylaluminum sesquichloride, and the like. Presently, the most preferred aluminum compounds are those containing the lower alkyl radicals, such as methyl and ethyl. When a chromium complex is utilized as the dimerization component, the organoaluminum halide employed is ethylaluminum dichloride.

In the catalyst system of the invention, the proportion of olefin disproportionation component to olefin dimerization component can vary from about 0.1 to about 1000, preferably 1 to about 100, mols of the former to each mol of the latter.

In accordance with one embodiment of the invention, we have found that varying the ratio of the disproportionation component to the olefin dimerization component in the catalyst system of the invention provides a change in the molecular weight distribution of the olefin products. Generally, greater proportions of the olefin dimerization component will produce a greater range of molecular weight of the olefin products.

The method of changing the molecular weight distribution of the products of contacting a feed olefin with the catalyst system of the invention is best illustrated with reference to the conversion of propylene. Propylene can be contacted with a catalyst system of the invention resulting in product olefins of conversion which have carbon atoms which range from $C_2$ to $C_8$ with only a trace of olefin products having a higher number of carbon atoms.

When propylene is contacted with a catalyst system in accordance with the invention wherein the ratio of the olefin dimerization component to the olefin disproportionation component is increased, it is found that the product effluent contains a substantial number of olefin compounds having carbon atom numbers which are higher than the $C_8$ olefin compounds in the first reaction. Accordingly, the invention provides a method of regulating the range of the olefin products utilizing the catalyst system of the invention by varying the ratio of the olefin dimerization component to the olefin disproportionation component.

The olefin disproportionation and olefin dimerization components are combined, to prepare the active catalyst system of the invention, with the suitable organoaluminum halide component in proportions which can range from about 0.1 to about 20, preferably from about 1 to about 10, mols of the organoaluminum halide to each mol of the transition metal of the olefin disproportionation component. The catalyst system is prepared simply by combining these components under conditions of time and temperature which permit the catalytically active catalyst to be formed. This combination occurs very readily and, in general, the components can be mixed at any convenient temperature within the range of $-80°$ to about $100°C$. for a few seconds or for periods up to several hours in the presence of a diluent in which all the components are at least partially soluble. Any convenient diluent such as chlorobenzene, methylene chloride, ethylene chloride, benzene, xylene, toluene, cyclohexane, and the like can be used for this purpose. Halogenated diluents are generally preferred. The mixing of these three catalyst components is generally carried out in the substantial absence of air or moisture, generally in an inert atmosphere. After the catalytic mixture is formed, it need not be isolated but can be added directly to the reaction zone as a solution in its preparation solvent. If desired, the three catalyst components can be separately added, in any order, to the reaction zone either in the presence or absence of the feed olefin.

According to the process of the invention, the conversion of the olefin or mixture of olefins can take place at any convenient temperature in the range of about $0°$ to about $150°C$. Good results are obtained with temperatures in the range of about $0°$ to about $75°C$. The conversion can be carried out at any convenient pressure which is sufficient to maintain a liquid phase within the reaction zone. A diluent is generally preferred and a diluent such as that used in the catalyst preparation, or other inert solvent, can be used in the reaction if desired. In general, an inert diluent which will maintain a substantially homogeneous reaction phase can be used. Normally, it is desirable to carry out the reaction at a pressure ranging up to about 2000 psig and preferably 20-750 psig. The time of contact will depend upon the desired degree of conversion with the specific feed olefins and specific catalyst used, but will, generally, be in the range of from about 0.1 minute to about 20 hours, preferably 5-20 minutes. The proportion of catalyst composition to olefin feed in the reaction zone will generally be in the range of from about 0.001-100 millimoles of the transition metal of the olefin disproportionation component per mol of olefin feed.

Any suitable contacting technique can be utilized for the conversion and batchwise or continuous operation can be utilized. After the desired degree of conversion of olefins, the produces so formed can be separated and isolated by conventional means such as by fractionation, cyrstallization, adsorption, and the like. The unconverted feed material can be recycled to the reaction zone. If desired, the catalyst can be destroyed by treatment with suitable deactivating agents such as water or alcohol, prior to the separation of the products.

Throughout the spefication and claims the term "homogeneous" when used with respect to a catalyst, catalyst system, or component of a catalyst or catalyst system means that the catalyst, catalyst system, or component is hydrocarbon soluble. Specifically, at $25°C$. at least 0.1 parts by weight of the catalyst or the catalyst system will dissolve in 100 parts by weight of cyclohexane, or at $25°C$. at least 0.1 parts by weight of the component of a catalyst or catalyst system will dissolve in 100 parts by weight of cyclohexane in the presence of an equimolar amount of ethylaluminum dichloride.

EXAMPLE I

A mixture of 0.09 g (0.2 mmol) $Mo(benzoate)_2Cl_3$ in 20 ml of chlorobenzene was treated with NO at 25 psig for 30 minutes. The mixture was taken vented and evacuated. Under a nitrogen atmosphere, 1 ml of chlorobenzene, containing 0.002 mmol of (triphenylphosphine)$_2$NiCl$_2$, was then added. The mixture was cooled in an ice bath and treated with 0.5 ml methylaluminum sesquichloride. Propylene was introduced into the system at 25 psig and that pressure was maintained for 2 hours at room temperature. The cold reaction mixture was then hydrolyzed by the addition of water and the organic phase was separated and analyzed. About 15 g of propylene had been absorbed by the reaction mixture. Gas-liquid chromatography showed that the organic phase of the reaction mixture consisted of the following olefins:

| Olefins | Weight % |
|---|---|
| $C_2$ | 0.8 |
| $C_3$ | 13.0 |
| $C_4$ | 56.2 |
| $C_5$ | 15.5 |
| $C_6$ | 6.4 |
| $C_7$ | 6.5 |
| $C_8$ | 1.6 |

The data in the above table show that the above-described catalyst system is capable of converting propylene to substantial amounts of butenes as well as smaller amounts of higher molecular weight olefins.

EXAMPLE II

A mixture of 0.75 g (1 mmol) of (triphenylphosphine)$_2$Mo(NO)$_2$Cl$_2$, 0.15 g (0.25 mmol) of (triphenylphosphine)$_2$NiCl$_2$, 50 ml chlorobenzene, and 1 ml of ethylaluminum dichloride was charged to a cold autoclave and pressured with propylene to 50 psi. After 1 hour at room temperature, the autoclave was vented and the reaction mixture was hydrolyzed by the addition of water. The organic phase was analyzed by gas-liquid chromatography. About 137 g of propylene had been absorbed by the reaction mixture. The analysis showed the following:

| Olefins | Weight % |
|---|---|
| $C_2$ | trace |
| $C_3$ | 1.2 |
| $C_4$ | 13.1 |
| $C_5$ | 9.9 |
| $C_6$ | 30.3 |
| $C_7$ | 18.4 |
| $C_8$ | 9.8 |
| higher | 17.1 |

Data in the above table show that increasing the quantity of the dimerization component broadens the range of product olefins.

EXAMPLE III

Example II was largely repeated except that the quantity of dimerization component was reduced. A 0.75 g quantity of (triphenylphosphine)$_2$-Mo(NO)$_2$Cl$_2$ was mixed with 50 ml chlorobenzene and 1 ml ethylaluminum dichloride while being cooled in an ice bath. In another vessel, also cooled in ice, 0.07 g (triphenylphosphine)$_2$NiCl$_2$ was mixed with 10 ml chlorobenzene and 0.1 ml ethylaluminum dichloride.

Both of the above-prepared solutions were charged into a dry, nitrogen-purged autoclave cooled in ice. Propylene was admitted at 50 psig and that pressure was maintained for 1 hour. During that time, the temperature ranged from 5° to 12°C.

At the end of the 1 hour reaction period a sample of the gas phase within the reactor was taken and analyzed by gas-liquid chromatography. The gas phase was found to consist of 9 percent ethylene, 28.5 percent propylene, and 62.5 percent butenes, by weight.

The reaction mixture was hydrolyzed by the addition of water and the organic phase separated and recovered. A total of 99 g of propylene had been absorbed by the reaction. Analysis of the liquid phase of the reaction mixture showed the following:

| Olefins | Weight % |
|---|---|
| $C_3$ | 1.6 |
| $C_4$ | 31.6 |
| $C_5$ | 16.4 |
| $C_6$ | 31.2 |
| $C_7$ | 13.6 |
| $C_8$ | 5.5 |
| $C_9$-16 | trace |

The data above again show that the catalyst of the present invention is effective for the interconversion of propylene, ethylene, and other higher olefins, not limited to multiples of propylene. Changing the proportions of the components of the catalyst components again produced a corresponding change in the range of olefin products.

Reasonable variations and modifications will be apparent to one skilled in the art from a reading of the disclosure and claims, which define the invention of a method of converting olefins to higher molecular weight olefins by contact with a catalyst system made from a homogeneous disproportionation component, a homogeneous dimerization component, and an organoaluminum adjuvant. The invention as disclosed and defined herein also contemplates as a composition of matter the catalyst which effects the above-mentioned conversion.

What is claimed is:

1. A method of converting acyclic monoolefins having from 3–12 carbon atoms per molecule to higher molecular weight olefins which comprises contacting the acyclic monoolefin with a catalyst system of a homogeneous olefin disproportionation component
   a. an NO containing molybdenum complex a homogeneous olefin dimerization component
   b. a complex of nickel represented by the formula $(R_3P)_2NiX_2$, $(L_1)_2NiX_2$, $(L_4)NiX_2$, or $(L_5)_2Ni$ wherein R is an aromatic or saturated aliphatic radical, or an aromatic or saturated aliphatic radical substituted with halo groups or alkoxy groups, $(L_1)$ is $R_3PO$, unsubstituted or R-substituted pyridine, or unsubstituted or R-substituted pyridine oxide, and X is chlorine, bromine or iodine, $(L_4)$ is unsubstituted or R-substituted 2,2'-bipyridines, $(L_5)$ is unsubstituted or R-substituted picolinate radicals, and the total number of carbon atoms in the complex does not exceed about 60; and a third component
   c. an organoaluminum halide represented by the formula $R_xAlX_y$ wherein $x$ and $y$ are integers of at least 1 whose total is 3, R is as defined above, and X is chlorine, bromine or iodine.

2. A method according to claim 1 wherein said NO containing molybdenum complex is selected from the group consisting of (triphenylphosphine)$_2$(NO)$_2$MoCl$_2$, (NO)$_2$MoCl$_2$, (pyridine)$_2$(NO)$_2$MoCl$_2$, NO-treated (triphenylphosphine)$_2$MoCl$_4$, NO-treated (pyridine)$_2$MoCl$_4$, NO-treated (butyronitrile)$_2$MoCl$_4$, Mo(stearate)$_2$(NO)$_2$Cl$_2$, NO-treated pyridine-treated MoCl$_5$, Mo(benzoate)$_2$(NO)$_2$Cl$_2$, NO-treated (acetylacetonate)$_2$MoO$_2$, NO-treated (butyronitrile)$_2$MoCl$_4$, NO-treated MoOCl$_3$, NO-treated tetrallyltin-treated MoCl$_5$, NOCl-treated MoO$_2$, NO-treated MoCl$_5$, NO-treated (cyclopentadienyl)Mo(CO)$_3$I, NOCl-treated pyridine-treated MoO$_2$, NO-treated (stearate)$_2$MoCl$_3$, NO-treated tributylphosphine-treated MoCl$_5$, NO-treated MoCl$_2$, NO-treated thiophene-treated MoCl$_5$, NO-treated MoO$_2$, and NO-treated Mo(acetate)$_2$.

3. A method according to claim 1 wherein the R radical within the compound according to the formula R$_x$AlX$_y$ is an alkyl radical containing 1–5 carbon atoms per radical.

4. A method according to claim 1 wherein the (a) component is bis(triphenylphosphine)dinitrosylmolybdenum dichloride; the (b) component is bis(triphenylphosphine)dichloronickel, and the (c) component is ethylaluminum dichloride.

5. A method according to claim 1 wherein the acyclic monoolefin is propylene and the resulting product substantial amounts of butene.

6. The method of claim 1 wherein the catalyst system further includes a diluent in which each of the components is at least partly soluble.

7. The method of claim 1 wherein the reaction is carried out at a temperature range of from about 0° to about 150°C. at a pressure sufficient to maintain a liquid phase for a length of time of from about 0.1 minute to about 20 hours, and wherein the proportion of acyclic monoolefin to catalyst is from about 0.001 to 100 millimoles of the molybdenum of the (a) component per mol of acyclic olefin.

8. The method of claim 1 wherein the acyclic monoolefins are non-tertiary hydrocarbons.

9. The method of claim 1 wherein the molar ratio of (b) component to the (a) component of the catalyst system is in the range of from about 0.1:1 to about 1000:1, and the amount of the (c) component is from 0.1 to about 20 mols of (c) per mol of the molybdenum of (a).

10. A method according to claim 9 wherein the acyclic monoolefin is propylene.

* * * * *

UNITED STATES PATENT OFFICE
CERTIFICATE OF CORRECTION

PATENT NO. : 3,865,892
DATED : February 11, 1975
INVENTOR(S) : Ernest A. Zuech

It is certified that error appears in the above-identified patent and that said Letters Patent are hereby corrected as shown below:

Column 10, line 49, before "a" insert --- ; ---.

Column 12, line 2, after "product" insert --- contains ---.

Signed and sealed this 15th day of July 1975.

(SEAL)
Attest:

RUTH C. MASON
Attesting Officer

C. MARSHALL DANN
Commissioner of Patents
and Trademarks